United States Patent [19]

Sankey et al.

[11] 4,132,422
[45] Jan. 2, 1979

[54] SEALING MEMBERS FOR UNIVERSAL JOINTS

[75] Inventors: Ivor G. Sankey; Colin F. S. Turner, Sutton Coldfield, both of England

[73] Assignee: GKN Transmissions Ltd., Birmingham, England

[21] Appl. No.: 787,519

[22] Filed: Apr. 14, 1977

[30] Foreign Application Priority Data

May 14, 1976 [GB] United Kingdom .............. 19952/76

[51] Int. Cl.² .............................................. F16D 3/02
[52] U.S. Cl. ................................... 277/212 FB; 64/8; 64/32 F
[58] Field of Search ............. 277/212 FB; 64/8, 32 F

[56] References Cited

U.S. PATENT DOCUMENTS

| | | | |
|---|---|---|---|
| 3,472,540 | 10/1969 | Gottschald | 277/212 FB |
| 3,798,927 | 3/1974 | Girguis | 64/21 |
| 3,830,083 | 8/1974 | Hadick et al. | 277/212 FB |
| 3,869,878 | 3/1975 | Davies | 64/21 |

FOREIGN PATENT DOCUMENTS

| | | | |
|---|---|---|---|
| 1400312 | 4/1965 | France | 277/212 FB |
| 636395 | 3/1962 | Italy | 277/212 FB |

*Primary Examiner*—Robert I. Smith
*Attorney, Agent, or Firm*—Roger W. Erickson

[57] ABSTRACT

A universal joint with outer and inner joint members connected for torque transmission, the inner joint member being received in a cavity in the outer joint member and having a bore in which a shaft is detachably received, has a flexible sealing member which is connected between the outer and inner joint members and has a sealing formation which engages the shaft when present to exclude dirt from the bore in the inner joint member.

3 Claims, 3 Drawing Figures

FIG.1.

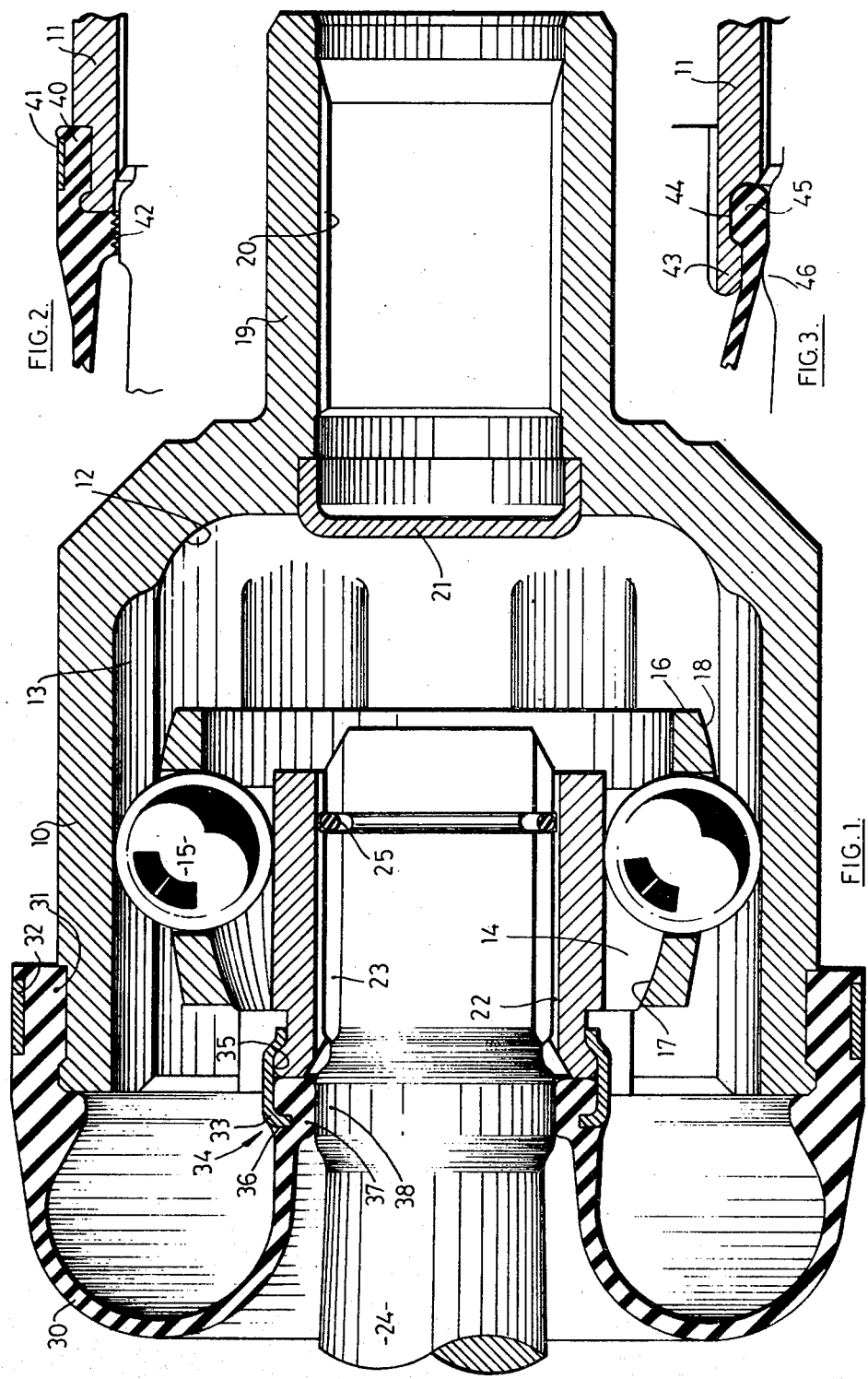

SEALING MEMBERS FOR UNIVERSAL JOINTS

BACKGROUND TO THE INVENTION

1. Field of the Invention

This invention relates to a universal joint of the kind which includes an outer joint member having a cavity at least partially within which is disposed an inner joint member, torque transmitting means interconnecting the outer and inner joint members for torque transmission whilst accommodating relative angular movement therebetween, the outer joint member being adapted to be connected to or being formed integrally with a shaft or other torque transmitting element and the inner joint member being formed with a bore adapted to receive a shaft, the shaft when thus received having torque transmitting relation with the inner joint member, e.g. by way of interengaging splines provided on the shaft and the inner joint member, and to a flexible sealing member for such a joint. Such a universal joint will hereinafter be referred to as a universal joint of the kind specified.

Universal joints of the kind specified are normally required to have a lubricant such as grease retained within the cavity of the outer joint member for lubricating the means which transmit torque between the inner and outer joint members. Such means may typically comprise balls engaging in complementary grooves in the inner and outer joint members, the balls being retained in a cage and being constrained, if the joint is a constant velocity ratio (homokinetic) joint, by suitable formation of parts of the joint to occupy a plane which bisects the angle between the rotational axes of the inner and outer joint members. For retaining such lubricant within the confines of the joint, and for excluding contaminants such as dust and grit therefrom, it is common to provide a flexible sealing member, normally termed a boot or gaiter, which covers the open end of the cavity and which will accommodate the angular movement between the inner and outer joint members. Such a boot is normally secured on the one hand to the periphery of the outer joint member, and on the other hand to either the shaft or the inner joint member.

Both these arrangements of sealing boot have disadvantages. If the boot is secured to the shaft, it is necessary to disconnect it from the shaft if for any reason the shaft should be required to be removed from the inner joint member. However, this arrangement has an advantage in that dirt is also excluded from the bore within the inner joint member and in which the shaft is received, which is of importance from the aspect of avoiding damage to the connection between the shaft and inner joint member, and from preventing dirt from reaching the torque transmitting parts of the joint by way of the bore. If the sealing boot is connected to the inner joint member, removal of the shaft does not entail dislocation of such connection, but the bore of the inner joint member is then left unprotected, and if it were required to prevent dirt from entering the bore this would necessitate the provision of a separate seal for this purpose.

SUMMARY OF THE INVENTION

It is an object of the present invention to provide a joint of the kind specified in which these disadvantages are overcome or reduced.

According to one aspect of the present invention, we provide a universal joint of the kind specified including a flexible sealing member connected to the outer joint member and to the inner joint member, such sealing member also being provided with a formation arranged to have sealing engagement with a shaft when such shaft is received within the bore in the inner joint member.

Preferably the sealing formation comprises an inwardly presented annular lip or bead formation, provided at or adjacent an attachment portion of the sealing member which is secured to the inner joint member.

By this construction, the bore in the inner joint member is, when a shaft is fitted, sealed against ingress of contaminant material, and yet the shaft can be relatively easily removed when desired without the necessity of disrupting a connection of the sealing member to the shaft itself.

According to another aspect of the invention, we provide a flexible sealing member for a universal joint of the kind specified, of generally annular form and U-section and including a first attachment portion adapted to be connected to the outer joint member, a second attachment portion adapted to be connected to the inner joint member, and a sealing formation for sealingly engaging a shaft received in the bore in the inner joint member.

BRIEF DESCRIPTION OF DRAWINGS

The invention will now be described by way of example with reference to the accompanying drawings, of which:

FIG. 1 is a longitudinal section through a universal joint of the kind specified provided with a sealing member embodying the invention, FIG. 2 shows part of a modification of the joint and sealing member of FIG. 1, FIG. 3 shows a further modification.

DESCRIPTION OF PREFERRED EMBODIMENTS

Referring firstly to FIG. 1, the joint there illustrated comprises an outer joint member 10 and an inner joint member 11, the latter being disposed within a cavity 12 of the outer joint member. The outer joint member is provided with inwardly facing longitudinally extending grooves 13, and the inner joint member is provided with outwardly facing complementary grooves 14, a plurality of balls 15 being received one in each pair of grooves for torque transmission between the inner and outer joint members. The balls are retained in apertures in a cage 16, the cage having a part-spherical internal surface 17 in engagement with a corresponding part-spherical external surface on the inner joint member 11, and an external part-spherical surface 18 engaging the internal wall of the outer joint member, the effect of such engagement being to constrain the cage and hence the balls to occupy a correct angular position relative to the inner and outer joint members.

The outer joint member 10 is formed integrally with a spigot 19 provided with a splined bore 20 in which a transmission shaft may be received. A cup-shaped member 21 fitted to the outer joint member prevents access to the internal cavity of the outer joint member by way of bore 20. The inner joint member 11 has an internally splined bore 22 within which a splined end 23 of a transmission shaft 24 is received and retained in position by a spring ring 25.

For sealing the cavity of the outer joint member against the ingress of contaminant material which could otherwise cause damage, there is provided a sealing boot or gaiter which takes the form of a generally annular, U-section, flexible sealing member 30. The member 30 terminates at its end which is of greater diameter in a first, annular, attachment portion 31 which is secured to the free end of the outer joint member by a clamping band 32. At its other, smaller diameter, end, the flexible member 30 has a second attachment portion 34 which is secured to the inner joint member 11 by a circumferential band 33 which fits over a lip 35 at the end of the inner joint member and in a groove 36 in the flexible member 30.

In the region of its portion which is attached to the inner joint member, the flexible member 30 is provided with an inwardly presented annular bead-formation 37 which sealingly engages an enlarged diameter portion 38 of the shaft 24. The flexible member 30 thus provides for the exclusion of contaminants from the internal cavity of the outer joint member through the open end of the latter, and also seals the bore in the inner joint member and its splined connection with the shaft 24.

This particular construction of sealing member thus eliminates the need for separate sealing devices at the point of entry of the shaft into the inner joint member, which would otherwise be necessary to prevent ingress of contaminants and for retention of the joint lubricant. Any tendency of the splined connection between the shaft and inner joint member to become corroded is thus largely overcome, eliminating the need to provide a corrosion inhibiting coating to the shaft or joint member splines. At the same time, moreover, removal of the shaft does not necessitate the disruption of the connection of the sealing member to the inner joint member.

Modifications of the sealing member and its connection to the inner joint member are shown in FIGS. 2 and 3. In FIG. 2, the sealing member itself is provided with an extended end portion 40 which is held on the inner joint member 11 by a clamping band 41. The sealing formation of the sealing member is provided with a plurality of V-Section annular grooves at 42, which under certain conditions can increase the effectiveness of its sealing action.

In FIG. 3, the inner joint member 11 is itself provided with an axial extension 43 defining an undercut groove 44. The sealing member terminates in a bead formation 45 which is partially accommodated in the groove 44 and is engaged between the inner joint member 11 and a suitably profiled enlarged portion 46 of the shaft. With this construction, it is still unnecessary to disturb the connection of the sealing member to the inner joint member if the shaft is removed.

A further advantage which can arise from the particular constructions of joint and sealing member herein described is that the radial distance between the points of attachment of the sealing member to the inner and outer joint members can be relatively increased, since the inner attachment point is extremely close to the shaft itself. The sealing member and thus the joint as a whole can thereby be made to accommodate relative bending and axial movement (plunge) between the inner and outer joint members without suffering excessive strain.

We claim:

1. A universal joint comprising an outer joint member defining a cavity, an inner joint member disposed at least partially within said cavity, torque transmitting means interconnecting the inner and outer joint members for torque transmission while accommodating relative angular movement therebetween, the inner joint member defining a bore therein, a shaft with an end portion removably received in said bore for torque transmission with the inner joint member, and a flexible sealing member for excluding contaminants from said cavity and of generally annular form with a first attachment portion connected to the outer joint member and a second attachment portion connected to the inner joint member, said flexible sealing member including, adjacent the second attachment portion, a radially inwardly protruding annular bead formation including an inwardly facing surface, the shaft being provided adjacent its said end portion with a formation affording an outwardly facing surface at a radius at least equal to the maximum radius of said end portion, said surfaces sealingly engaging one another when the shaft is in position in the bore.

2. A universal joint according to claim 1 wherein said inwardly facing surface of the bead formation is formed with a plurality of annular grooves.

3. A universal joint according to claim 1 wherein said inner joint member defines an undercut annular groove, and said second attachment portion of the sealing member is received in said groove and accommodated between said inner joint member and said shaft.

* * * * *